United States Patent
Kim

(10) Patent No.: US 9,010,713 B2
(45) Date of Patent: Apr. 21, 2015

(54) SEAT TRACK LOCKING SYSTEM FOR VEHICLE

(75) Inventor: Kyung Wook Kim, Incheon (KR)

(73) Assignee: KM&I. Co., Ltd. (KR)

( * ) Notice: Subject to any disclaimer, the term of this patent is extended or adjusted under 35 U.S.C. 154(b) by 196 days.

(21) Appl. No.: 13/809,989

(22) PCT Filed: Dec. 28, 2010

(86) PCT No.: PCT/KR2010/009396
§ 371 (c)(1),
(2), (4) Date: Jan. 14, 2013

(87) PCT Pub. No.: WO2012/008665
PCT Pub. Date: Jan. 19, 2012

(65) Prior Publication Data
US 2013/0112833 A1    May 9, 2013

(30) Foreign Application Priority Data
Jul. 16, 2010  (KR) .................. 10-2010-0068976

(51) Int. Cl.
*B60N 2/08* (2006.01)
*B60N 2/07* (2006.01)

(52) U.S. Cl.
CPC ............ *B60N 2/0806* (2013.01); *B60N 2/0893* (2013.01); *B60N 2/0705* (2013.01); *B60N 2/0715* (2013.01); *B60N 2/0818* (2013.01); *B60N 2/0875* (2013.01); *B60N 2/0856* (2013.01)

(58) Field of Classification Search
CPC .. B60N 2/0806; B60N 2/0893; B60N 2/0887; B60N 2/08; B60N 2/0705; B60N 2/0818; B60N 2/0881

USPC .......... 248/429, 424, 430; 297/344.1, 344.11; 296/65.13–65.15
See application file for complete search history.

(56) References Cited

U.S. PATENT DOCUMENTS

| | | | | |
|---|---|---|---|---|
| 4,964,608 | A * | 10/1990 | Rogala et al. ................. | 248/429 |
| 6,113,051 | A * | 9/2000 | Moradell et al. .............. | 248/430 |
| 6,322,036 | B1* | 11/2001 | Tame et al. .................... | 248/429 |
| 6,772,985 | B2* | 8/2004 | Lee ............................... | 248/424 |
| 7,000,880 | B2* | 2/2006 | Jaudouin ....................... | 248/429 |

(Continued)

FOREIGN PATENT DOCUMENTS

| | | |
|---|---|---|
| CN | 101585325 | 11/2009 |
| JP | 2003231433 | 8/2003 |

(Continued)

OTHER PUBLICATIONS

International Search Report—PCT/KR2010/009396 dated Aug. 29, 2011.

*Primary Examiner* — Ingrid M Weinhold
(74) *Attorney, Agent, or Firm* — Cantor Colburn LLP

(57) ABSTRACT

A seat track for a vehicle which can be adjusted forward and backward, in more detail, a seat track locking system for a vehicle which includes a plurality of locks for fixation or movement of the track that are spaced from each other by a half of a pitch thereby finely adjusting the seat track while maintaining the existing fixing-strength of the seat track. The seat track locking system for a vehicle having the configuration described above has an effect of ensuring strength against shock and load when the seat track is fixed, and allowing fine adjustment when the seat is adjusted forward and backward.

6 Claims, 5 Drawing Sheets

(56) References Cited

U.S. PATENT DOCUMENTS

| | | | |
|---|---|---|---|
| 7,293,752 B2 * | 11/2007 | McCulloch et al. | 248/429 |
| 7,328,877 B2 * | 2/2008 | Yamada et al. | 248/430 |
| 7,780,138 B1 * | 8/2010 | Lee et al. | 248/429 |
| 8,215,602 B2 * | 7/2012 | Walter et al. | 248/424 |
| 8,573,698 B2 * | 11/2013 | Wojatzki et al. | 297/344.1 |
| 2007/0001498 A1 * | 1/2007 | Bauersachs et al. | 297/341 |
| 2009/0289485 A1 * | 11/2009 | Walter et al. | 297/344.1 |
| 2011/0193389 A1 * | 8/2011 | Wojatzki et al. | 297/344.1 |

FOREIGN PATENT DOCUMENTS

| | | |
|---|---|---|
| JP | 2006290029 | 10/2006 |
| JP | 2006298252 | 11/2006 |
| KR | 100795658 | 1/2008 |

* cited by examiner

SEAT TRACK LOCKING SYSTEM FOR VEHICLE

Technical Field

The present invention relate to a seat track for a vehicle which can be adjusted forward and backward, in more detail, a seat track locking system for a vehicle which includes a plurality of locks for fixation or movement of the track that are spaced from each other by a half of a pitch thereby finely adjusting the seat track while maintaining the existing fixing-strength of the seat track.

Background Art

Generally, the seat of a vehicle is for maintaining the seated posture of a passenger to be an optimized state, and is constructed to include a seat back configured to support the passenger's upper body and a seat cushion configured to support the passenger's lower body, such as buttocks, thighs and the like.

Furthermore, in order for the somatotype of a passenger and the efficient utilization of the vehicle's interior space, the seat of the vehicle is mounted to be slidably movable in the forward and backward direction of the vehicle's body over a predetermined range, which is enabled by a seat track.

The seat track is configured to include a lower rail mounted to be fixed to a floor panel in the longitudinal direction of the vehicle body and an upper rail coupled to be slidably movable along the lower rail and coupled to the seat cushion.

In this configuration, the upper rail should be able to move along the lower rail over a predetermined range and be then temporarily fixed to the lower rail, which is implemented by a locking system. That is, the seat track includes the locking system, in addition to the lower rail and the upper rail.

Therefore, since the upper rail slides along the lower rail when the locking system is unlocked, the seat of the vehicle can move forward and backward with respect to the vehicle body over a predetermined range. Accordingly, it is possible to effectively use the interior space and the passenger can keep riding comfort in the seat.

Therefore, the locking system can be considered to be very important in the seat track and a common method is to maintain the seat track to be locked using an elastic force of a spring member, unlock and slide the seat track to a desired position by providing a force exceeding the elastic force of the spring member, and then maintain the seat track to be locked again by the spring member by removing the force.

The locking system is mounted on the upper rail in which a lock having a lock protrusion is coupled be locked in a lock groove formed in the lower rail to fix the upper rail, and the upper rail slides forward and backward along the lower rail, when the lock is separated from the lock groove.

In this configuration, a plurality of lock protrusions is formed in both ends of the lock along the longitudinal direction thereof to be spaced from each other at a predetermined distance, in which the interval between adjacent lock protrusions is called a pitch and an adjustment distance depends on the pitch. The pitch of common locking systems is about 8 mm and therefore, the adjustment interval of a seat using the system is 8 mm.

Recently, specifications for more fine adjustment than the existing adjustment intervals is required for the seat locking systems, in order to satisfy various desires of users and improve convenience.

However, when the adjustment interval of the seat is 8 mm or less, the interval between the lock protrusions should be correspondingly reduced, and accordingly, the interval between the lock grooves in the lower rail should be reduced and strength is correspondingly reduced. Accordingly, when the lock protrusions fixed in the lock groove, the lock protrusions may be deformed and broken by shock or load.

Therefore, it is required to develop a technology that can reduce the adjustment distance of the seat while ensuring the strength against shock or load from the outside when the lock protrusions are fixed to the lock grooves.

DISCLOSURE OF INVENTION

Technical Problem

The present invention has been made in an effort to solve the problems and it is an object of the present invention to provide a seat track locking system for a vehicle in which the interval between the lock protrusions of locks is set to a predetermined sufficient distances to ensure strength and a plurality of locks arranged to be spaced from each other at a half of the pitch of the lock protrusions are included such that any one of the locks is fixed to a lock groove when the seat is adjusted thereby a seat being finely adjusted.

Further, it is another object of the present invention to provides a seat locking system for a vehicle which can be inserted into an upper rail and applied to existing seat tracks by making the shapes of locks asymmetric and using torsion springs for an elastic members applying an elastic force to the locks thereby having a similar size to the existing lock systems.

Further, it is another object of the present invention to provide a seat locking system for a vehicle which can simplify the configuration of an operating part that operates locks by arranging the locks as close as possible.

Solution to Problem

The present invention provides a seat track locking system for a vehicle, which comprises: a lower rail fixed to a floor of an inside of the vehicle and having lock grooves formed thereon at regular intervals along a longitudinal direction of the vehicle, the lock grooves each being opened downwardly; an upper rail fixed to a bottom of a vehicle seat and inserted into the lower rail to be slidable on the lower rail in the longitudinal direction of the vehicle; a seat locking assembly mounted in the upper rail and fixing or sliding the upper rail on the lower rail by means of an operating part, the seat locking assembly comprising: a lock bracket mounted on an inner side of the upper rail; a first lock vertically-movably mounted in the lock bracket and having first lock protrusions inserted into the lock grooves, wherein the first lock is elastically biased upwardly by a first elastic member mounted on a first lateral side of the lock bracket, and the first lock protrusions are spaced apart from each other at a first pitch P1; and a second lock vertically-movably mounted in the lock bracket and having second lock protrusions inserted into the lock grooves, wherein the second lock is elastically biased upwardly by a second elastic member mounted on a second lateral side of the lock bracket and the second lock protrusions are spaced apart from each other at a second pitch P2, wherein the first lock includes a first side extending part extending along a longitudinal direction of the upper rail toward the second lock creating a first recessed portion in the first lock, and the second lock includes a second side extending part extending along the longitudinal direction of the upper rail toward the first lock creating a second recessed portion in the second lock, the first side extending part is located within the second recessed portion of the second lock, and the second side extending part is located within the first recessed portion of the first lock, and the first lock and the second lock are arranged in a line along the longitudinal direction of the upper rail.

In one embodiment, a third pitch P3 is set between the first lock and the second lock to be larger than the first pitch P1 or the second pitch P2 by a value of a half of the first pitch P1 or the second pitch P2, so that only the protrusions of one of the first lock and the second lock are inserted into the lock grooves of the lower rail.

In one embodiment, the seat locking assembly includes: a first lock pin having an upper end extending above an upper end of the upper rail and a lower end coupled to the first lock, the first lock pin retained within the lock bracket, wherein the first lock pin delivers an external force from the operating part to the first lock; and a second lock pin having an upper end extending above the upper end of the upper rail and coupled to the second lock, the second lock pin retained within the lock bracket, wherein the second lock pin delivers an external force from the operating part to the second lock.

In one embodiment, the seat locking assembly includes: a first vertically elongated slit hole extending through the first lock pin; a second vertically elongated slit hole extending through the second lock pin; a guide pin hole formed in a location of the lock bracket corresponding to the first slit hole and the second slit hole; and a guide pin inserted into the first slit hole, the second slit hole and the guide pin hole.

In one embodiment, the first elastic member includes one end fitted to a first fixing shaft formed in the first lateral side of the lock bracket and a second end supported by the first lock pin such that when the first lock protrusions are within the lock grooves of the lower rail the first lock protrusions are maintained inside the lock grooves; and the second elastic member includes one end fitted to a second fixing shaft formed in the second lateral side of the lock bracket and a second end supported by the second lock pin such that when the second lock protrusions are within the lock grooves of the lower rail the second lock protrusions are maintained inside the lock grooves, wherein the first elastic member and the second elastic member are coil torsion springs.

In one embodiment, the operating part includes: a lever rod coupled to one side of the upper rail, the lever rod comprising a longitudinal axis to rotate about; an operating lever having one end fixed to the lever rod; a lever bracket having one end fixed to the lever rod and a second end positioned at the upper ends of the first lock pin and the second lock pin, and further comprising a lever stopper disposed on the upper rail to prevent separation of the lever bracket.

In one embodiment, the seat locking assembly includes: first side holes formed at one side of the upper rail; second side holes formed on the lock bracket in locations corresponding to the first side holes; and pin locks inserted into and fixed to the first side holes and the second side holes.

Advantageous Effects of Invention

The seat track locking system for a vehicle of the present invention having the configuration described above has an effect of ensuring strength against shock and load when the seat track is fixed, and allowing fine adjustment when the seat is adjusted forward and backward.

Furthermore, the present invention can improve availability of the space for the seat track and can be applied to existing seat tracks, because the size is not larger than the locking systems having one lock according to the related art, even though a plurality of locks are used.

In addition, since the configuration of an operating part of for simultaneously operating a number of locks is simplified, spatial availability is improved and the manufacturing cost is reduced.

BEST MODE FOR CARRYING OUT THE INVENTION

The seat of a vehicle is constructed to include a seat back configured to support the passenger's upper body and a seat cushion configured to support the passenger's lower body, such as buttocks, thighs and the like.

Furthermore, in order for the somatotype of a passenger and the efficient utilization of the vehicle's interior space, the seat of the vehicle is mounted to be slidably movable in the forward and backward direction of the vehicle's body over a predetermined range, which is enabled by a seat track.

Hereinafter, an exemplary embodiment of the present invention will be described in detail with reference to the accompanying drawings.

Figure 1:
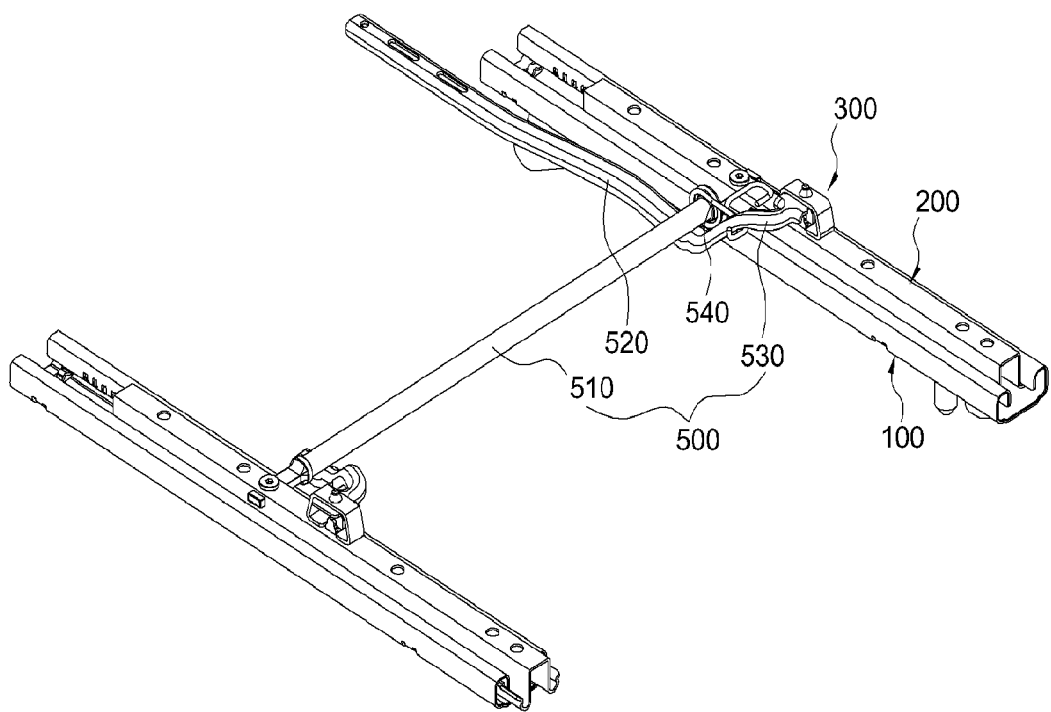
FIG. 1 is a perspective view showing a seat track locking system of the present invention.
Figure 2:
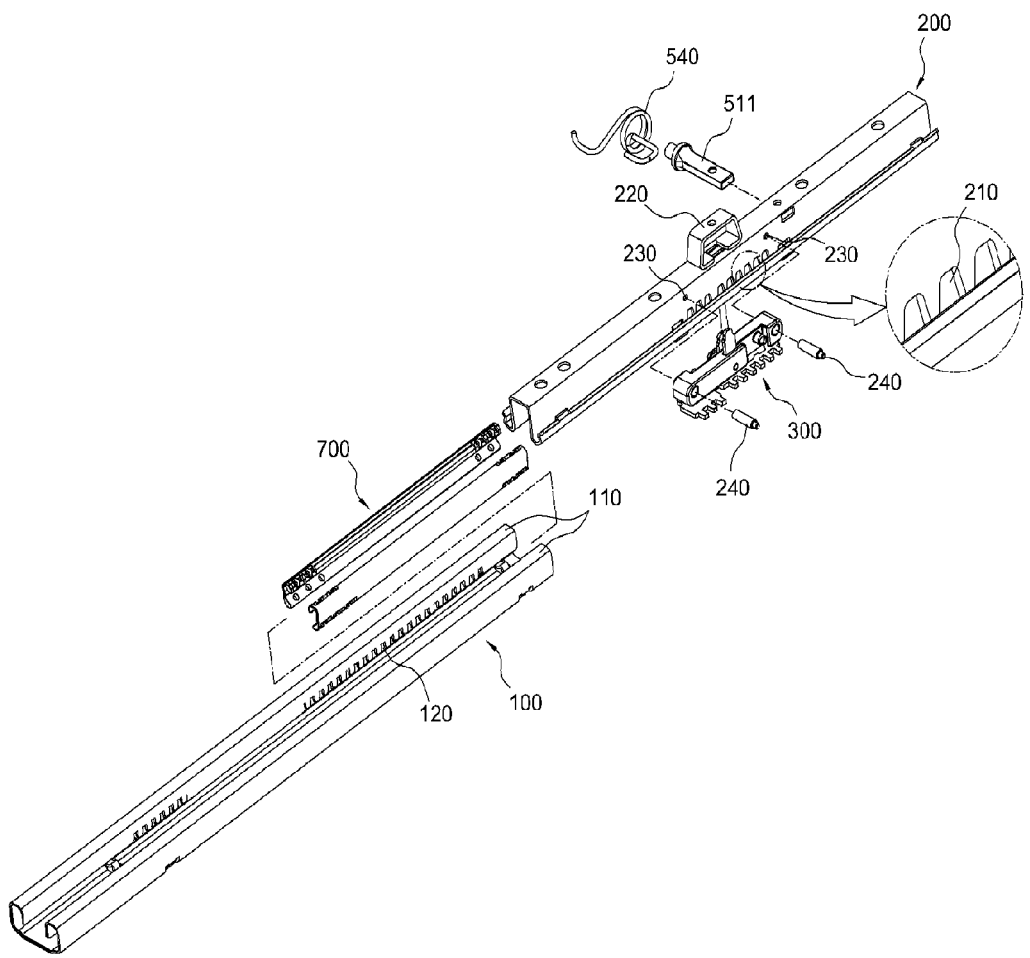
FIG. 2 is a partial perspective view showing the seat track locking system of the present invention.

Referring to FIGS. 1 and 2, a seat track locking system of the present invention includes a lower rail 100, an upper rail 200, a seat locking assembly 300, and an operating part 500.

Referring to FIG. 1, the seat track locking system is configured such that all configurations thereof are formed to have left and right parts symmetrical to each other except for the operating part 500, so that, in this embodiment, the right part's configuration is mainly described in detail.

Referring to FIG. 2, the seat track locking system of the present invention is configured to include a lower rail 100 mounted to be fixed to the floor panel of a vehicle in the longitudinal direction of the vehicle's body and an upper rail 200 coupled to be slidably movable along the lower rail 100 and coupled to the seat cushion. In addition, in order to smoothly slide the upper rail 200, a plurality of bearing members are installed to be inserted into a space between the lower rail 100 and the upper rail 200. The bearing member has a structure installed to be integrated with a retainer 700.

The lower rail 100 may be fixed to the lower surface of the inside of the vehicle. The lower rail 100 may be formed in a longitudinal direction related to the front and rear of the vehicle. The lower rail 100 can be formed such that both sides thereof are extended upward with respect to the bottom surface thereof and are then bended toward its center when viewed from the cross-sectional surface of the lower rail. In the both sides bended toward the lower rail's center, flanges 110 bended downward may be formed respectively. Lock grooves 120 each having a lower part opened downward may be formed in the flanges 110 at regular intervals along the longitudinal direction thereof. The lock groove 120 may be formed to have a width increasing toward the lower end thereof. This is for more firmly fixing the upper rail 200 and the lower rail 100 by decreasing clearance when coupled with a first lock 320 or a second lock 330, which are components of the seat locking assembly 300.

The upper rail 200 may be mounted to be fixed to the lower surface of the seat of the vehicle. The upper rail 200 may be formed in the longitudinal direction with respect to the front and rear of the vehicle so as to be inserted into the lower rail 100 and be slidable along the longitudinal direction of the lower rail 100. Both side surfaces of the upper rail 200 are contacted against the flanges 110, and guide holes 210 may be formed at the both side surfaces. The configuration of guide holes 210 is described in detail in connection with the seat locking assembly 300 that is described below. A lever stopper 220 may be mounted on the upper surface of the upper rail 200. The lower surface of the lever stopper 220 is contacted against the upper surface of a lever bracket 530 as described below thereby preventing the lever bracket 530 from moving upward and being deviated therefrom. A plurality of first side holes 230 may be formed at the side surfaces of the upper rail 200. They are configurations for fixation of the seat locking assembly 300 which is described below. When the configurations for fixation of the seat locking assembly 300 are formed on the side surfaces of the upper rail 200, there is an advantage in that obstruction with respect to other parts located on the upper side of the upper rail 200 is minimized Referring to FIGS. 2 to 5, the seat locking assembly 300 is inserted into and fixed to the inside of the upper rail 200. The seat locking assembly 300 is configured to include a lock bracket 310, a first lock 320, a second lock 330, a first lock pin 340, a second lock pin 350, a first elastic member 360, and a second elastic member 370.

The lock bracket 310 includes a first fixing shaft 312, a second fixing shaft 311, a first guide groove 314, a second guide groove 313, a guide pin hole 315, and second side holes 316.

The lock bracket 310 may be inserted into and fixed to the inside of the upper rail 200. For this, the second side holes 316 may be formed in the side surfaces of the lock bracket 310 so as to correspond to the first side holes 230. The lock bracket 310 is fixed to the upper rail 200 through pin locks 240 inserted into and fixed to the first side holes 230 and the second side holes 316. The first fixing shaft 312, which is a configuration for fixation of the first elastic member 360, may be formed to be protruded outward from one surface thereof at one end of the lock bracket 310. The second fixing shaft 311, which is a configuration for fixation of the second elastic member 370, may be formed to be protruded outward from the other surface thereof at the other end of the lock bracket 310. The first guide groove 314 is formed in one surface at the center the lock bracket 310 and the upper end of the first lock fin 340 is fitted thereto and guided therein. The second guide groove 313 is formed in the other surface at the center the lock bracket 310 and the upper end of the second lock fin 350 is fitted thereto and guided therein. The guide pin hole 315, which is a configuration for smooth movement of first and second lock pins 340 and 350, may be formed at the center of the lock bracket 310.

The first lock pin 340 is fitted to the first guide groove 314 of the lock bracket 310 to be moveable up and down and includes a first upper end 343 extending over the upper end of the upper rail 200 and a lower end coupled to the first lock 320, thereby playing a role to deliver external force from the operating part 500 to the first lock 320. A first slit hole 341 is formed to be passed through the first lock pin 340 in a up/down longitudinal direction. The first slit hole 341 is formed to correspond to the guide pin hole 315, and a guide pin 380 is inserted into and fixed to the first slit hole 341 and the guide pin hole 315. Accordingly, there is an advantage in that the first lock pin 340 can be moveable up and down along the first slit hole 341.

The first lock pin 340 is fitted to the first guide groove 314 of the lock bracket 310 to be moveable up and down and includes the first upper end 343 extending over the upper end of the upper rail 200 and the lower end coupled to the first lock 320, thereby playing a role to deliver external force from the operating part 500 to the first lock 320. The first slit hole 341 is formed to be passed through the first lock pin 340 in an up and down longitudinal direction. The first slit hole 341 is formed to correspond to the guide pin hole 315, and a guide pin 380 is inserted into and fixed to the first slit hole 341 and the guide pin hole 315. Accordingly, there is an advantage in that the first lock pin 340 can be smoothly moveable up and down along the first slit hole 341. A first protrusion 342 is formed in the first lock pin 340 to retain the first lock pin 340 not to move up above a predetermined distance.

The second lock pin 350 is fitted to the second guide groove 313 of the lock bracket 310 to be moveable up and down and includes a second upper end 353 extending over the upper end of the upper rail 200 and a lower end coupled to the second lock 330, thereby playing a role to transfer external force from the operating part 500 to the second lock 330.

In this configuration, the first upper end 343 and the second upper end 353 are arranged as close to each other as possible. The first upper end 343 and the second upper end 353 should be simultaneously pressed when the seat is adjusted; however, when the first upper end 343 and the second upper end 353 are spaced apart, it is complicated to simultaneously press the first upper end 343 and the second upper end 353, so that the manufacturing cost increases. However, in the present invention, since the first upper end 343 and the second upper end 353 are arranged as close to each other as possible, it becomes simplified to simultaneously press the first upper end 343 and the second upper end 353, thereby reducing the manufacturing cost.

A second slit hole 351 is formed to be passed through the second lock pin 350 in a up and down longitudinal direction. The second slit hole 351 is formed to correspond to the guide pin hole 315, and the guide pin 380 is inserted into and fixed to the second slit hole 351 and the guide pin hole 315. Accordingly, there is an advantage in that the second lock pin 350 can be smoothly moveable up and down along the second slit hole 351. A second protrusion 352 is formed in the second lock pin 350 to retain the second lock pin 350 not to move upward above a predetermined distance.

One end of the first elastic member 360 may be fitted to the first fixing shaft 312. A first latch 361 formed in the other end of the first elastic member 360 is supported by the first lock pin 340 to maintain the first lock pin 340 to be located above the lock bracket 310.

The other end of the second elastic member 370 may be fitted to the second fixing shaft 311. A second latch 371 formed in one end of the second elastic member 370 is supported by the second lock pin 350 to maintain the second lock pin 350 to be located above the lock bracket 310.

In this case, the first elastic member 360 and the second elastic member 370 may be implemented using coil torsion springs. Therefore, the first elastic member 360 and the second elastic member 370 allow the installation space inside the lock bracket 310 to be maximally minimized, so that there is an advantage in that the lock bracket 310 can be miniaturized.

In addition, the first elastic member 360 and the second elastic member 370 may be formed by winding a coil twice. This is for providing a more elastic force. When the coil is less wound, a restoring force may be decreased due to reduction of the elastic force, and when the coil is more wound, the volume thereof is increased thereby so that it is difficult to ensure a space and a large force is required for overcoming the elastic force.

The first lock 320 is mounted in the lower end of the first lock pin 340 and the second lock 330 is mounted in the lower end of the second lock pin 350.

Figure 3:
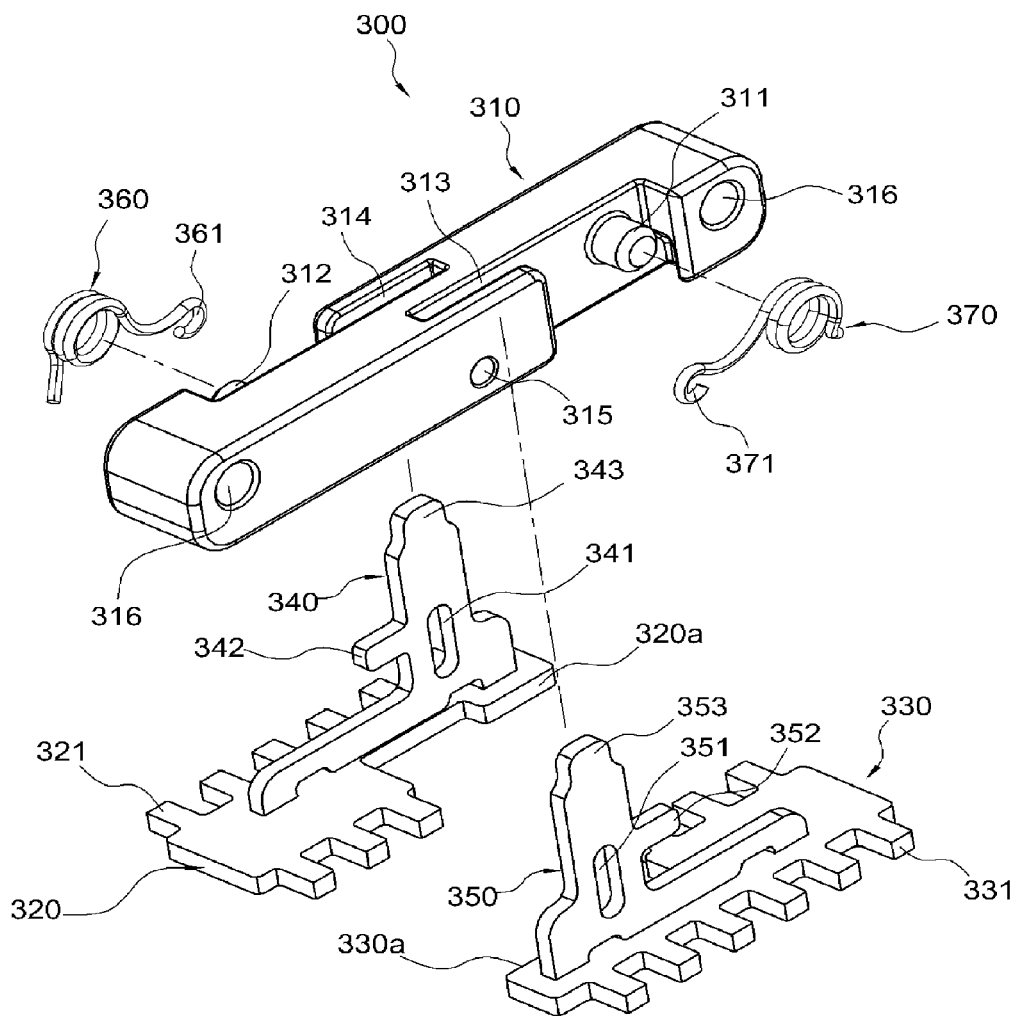
FIG. 3 is an exploded perspective view showing a seat locking assembly of the present invention.

The first lock 320 may include a substantially horizontal plate as shown in FIG. 3. The first lock 320 includes first lock protrusions 321 extending outwardly from opposite sides of the plate which are inserted into and removed from the lock grooves 120 of the lower rail 100 and a first side extending part 320a extending along a longitudinal direction of the upper rail creating a first recessed portion in the first lock. A number of first lock protrusions 321 are formed to be spaced from each other by a first pitch P1 along the longitudinal direction of the upper rail 200 on the both sides of the first lock 320 and on only one side of the first side extending part 320a. The first lock protrusions 321 extend outside the upper rail through the guide holes 210 of the upper rail 200, so that, when moving up, the sides thereof are inserted into the lock grooves 120 of the lower rail 100 such that the upper rail 100 is fixed to the lower rail 100, and, when moving down, the sides thereof are separated from the lock grooves 120 of the lower rail 100 such that the upper rail 100 is moveable to be slidable on the lower rail 100. In this case, the guide holes 210 may be formed as much as the numbers of the first lock protrusions 321 and second lock protrusions 331 described below, and be formed to have a sufficient vertical width such that the first lock protrusions 321 can move up and down. It is to be noted that the guide holes 210 may be formed to have a horizontal width identical to the horizontal width of the first lock protrusions 321, thereby preventing clearance from being generated upon fixation of the lower rail 100 and the upper rail 200.

The second lock 330 may include a substantially horizontal plate as shown in FIG. 3. The second lock 330 includes second lock protrusions 331 extending outwardly from opposite sides of the plate which are inserted into and removed from the lock grooves 120 of the lower rail 100 and a second side extending part 330a extending along a longitudinal direction of the upper rail creating a second recessed portion in the second lock. A number of first lock protrusions 331 is formed to be spaced from each other by a second pitch P2 along the longitudinal direction of the upper rail 200 on the both sides of the second lock 330 and on only the other side of the second side extending part 330a. The second pitch P2 is to be shown to be discriminated from the first pitch P1 for convenience, but the length thereof is identical to that of the first pitch P1. The second lock protrusions 331 extend outside the upper rail through the guide holes 210 of the upper rail 200, so that, when moving up, the sides thereof are inserted into the lock grooves 120 of the lower rail 100 such that the upper rail 100 is fixed to the lower rail 100, and, when moving down, the sides thereof are separated from the lock grooves 120 of the lower rail 100 such that the upper rail 200 is moveable to be slidable on the lower rail 100. In this case, the guide hole 210 may be formed to have a sufficient vertical width such that the second lock protrusion 331 can be movable up and down. It is to be noted that the guide grooves 210 may be formed to have a horizontal width identical to the horizontal width of the second lock protrusions 331, thereby preventing clearance from being generated upon fixation of the lower rail 100 and the upper rail 200.

Figure 4:
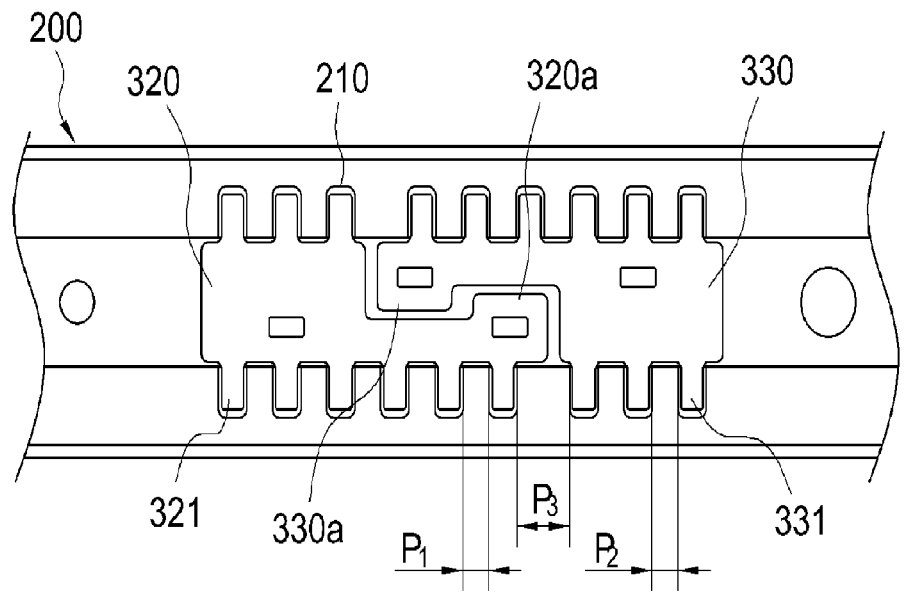
FIG. 4 is a bottom view showing the seat locking assembly of the present invention.
Figure 5:
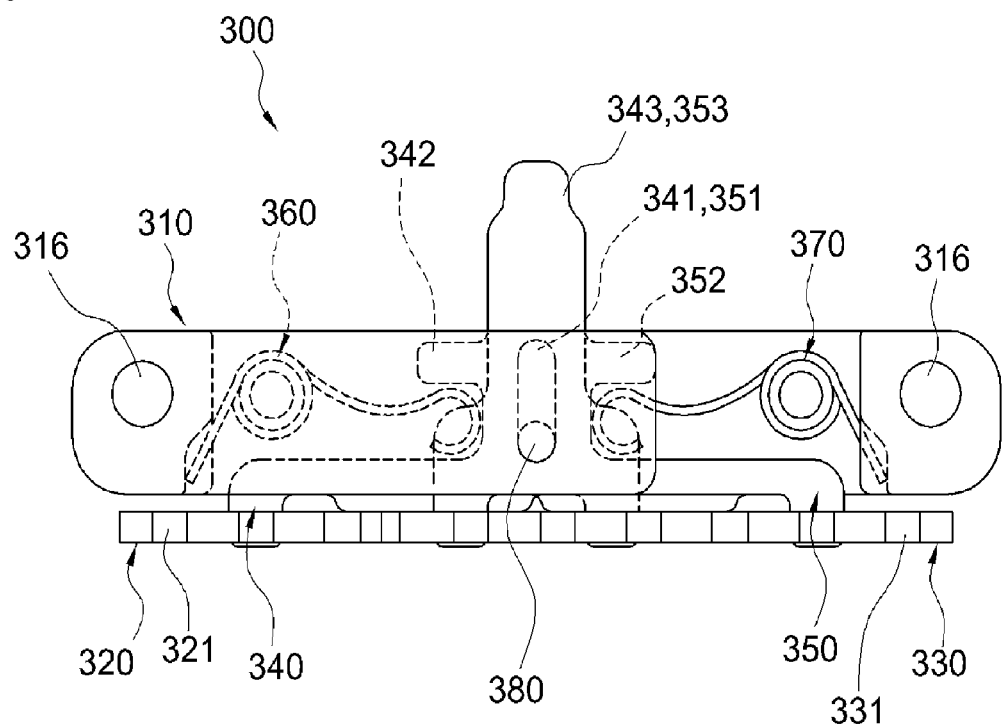
FIG. 5 is a side perspective view showing the seat locking assembly of the present invention.

In this configuration, the first lock 320 and the second lock 330 are arranged in a line along the longitudinal direction of the upper rail 200 with the first side extending part 320a extending toward the second lock 330 and the second side extending part 330a extending toward the first lock 320. Accordingly, the first side extending part 320a is located within the second recessed portion of the second lock and the second side extending part 330a is located within the first recessed portion of the first lock as shown in FIG. 4. According to the configuration described above, the first lock 320 and the second lock 330 include a part in which the first lock protrusions 321 and the second lock protrusions 331 are formed on both sides thereof, so that a seat-fixing strength can be ensured and, at the same time, the length of the seat locking assembly 300 can be minimized through the first side extending part 320a and the second side extending part 330a.

The first lock protrusions 321 and the second lock protrusions 331 are configured to extend outside the upper rail 200 through the guide holes 210 of the upper rail 200. Accordingly, when the first lock 320 and the second lock 330 move upward, the side parts of the first lock protrusions 321 and the second lock protrusions 331 exposed outside the upper rail 200 through the guide holes 210 are inserted into the lock grooves 120 of the lower rail 100, so that the upper rail 200 is fixed to the lower rail 100. Furthermore, when the first lock 320 and the second lock 330 move downward, the side parts of the first lock protrusions 321 and the second lock protrusions 331 are separated from the lock grooves 120 of the lower rail 100, so that the upper rail 200 is moveable to slide the lower rail 100. In this case, the guide hole 210 may be formed to have a sufficient vertical width such that the first lock protrusion 321 and the second lock protrusion 331 can be movable up and down. Meanwhile, the horizontal width of guide hole 210 may be formed to identical to that of the first lock protrusion 321 and the second lock protrusion 331. As shown in the partial enlarged view of FIG. 2, the guide hole 210 may be configured to have a width increasing from the upper end to the lower end. Accordingly, when the first lock 320 and the second lock 330 are fixed to the lock grooves 120, it is possible to allow a clearance not to be generated between the lower rail 100 and the upper rail 200.

A third pitch P3, which is a spaced distance between the first lock protrusion 321 formed on the other side of the first lock 320 and the second lock protrusion 331 formed on one side of the second lock 330, is set to be larger than the first pitch P1 or the second pitch P2 by the value of/1;2 of the first pitch P1 or the second pitch P2, so that only one of the first lock protrusion 321 of the first the lock 320 and the second lock protrusion 331 of the second lock 330 is inserted into the lock grooves 120 of the lower rail 100.

This allows that the interval between the lock protrusions is maintained to be identical to the related art to ensure a fixing strength upon fixation of a seat, and the seat can be finely adjusted at an interval less than and by a half of the interval between the lock protrusions when adjusting the seat through the first lock 320 and the second lock 330 arranged to be spaced from each other by a half of a pitch.

Referring to FIGS. 1 and 2, the operating part 500 includes a lever rod 510, an operating lever 520, a lever bracket 530, and a lever spring 540.

The operating part 500 functions to deliver an external force to the first or second lock pin 340 or 350. In other words, in the state in which any one of the first lock protrusion 321 of the first lock 320 and the second lock protrusion 331 of the second lock 330 is fixed to the lock groove 120 of the lower rail 100 by the elastic force of the first or second elastic member 360 or 370, the external force exceeding the elastic force of the first or second elastic member 360 or 370 is delivered to the upper end of the first or second lock pin 340 or 350 so that any one of the first lock protrusion 321 of the first lock 320 and the second lock protrusion 331 of the second lock 330 is separated from the lock groove 120 of the lower rail 100. The configuration for this operation is as follows.

The lever rod 510 has a bar shape. Both ends of the lever rod 510 may be coupled to the sides of the upper rails 200. The inner peripheral surface of the distal end of the lever rod 510 is coupled to be fitted to outer peripheral surface of a slide lever fin 511 may be fixed to the sides of the upper rails 200, so that the lever rod 510 may be coupled to be rotated about the longitudinal axis thereof. The lever rod 510 transforms a force pressed onto an operating lever 520 into rotational movement and delivers it to the lever bracket 530.

The operating lever 520 may have one side that is held by a hand and the other side fixed to the lever rod 510.

The lever bracket 530 has one side fixed to the lever rod 510 and the other side positioned at the upper ends of the first and second lock pins 340 and 350. That is, the lower surface of the other side of the lever bracket 530 is contacted against the upper surface of the first upper end 343 and the upper surface of the second upper end 353 of the first and second lock pins 340 and 350 and delivers the rotational force received from the lever rod 510 to the first or second lock pin 340 or 350. In this configuration, the upper surface of the other side of the lever bracket 530 is contacted against the lower surface of the lever stopper 220 thereby preventing the lever bracket 530 from being deviated therefrom upward.

In addition, since the first upper end 343 and the second upper end 353 are arranged close to each other as described above, it is possible to minimize the pressed area of the lever bracket 530, and accordingly, it is possible to ensure a space and reduce the manufacturing cost.

The lever spring 540 may be disposed between the lever rod 510 and the operating lever 520. When there is no external force, the lever spring 540 allows the operating lever 520 to be positioned at the lower position, thereby preventing the lever bracket 530 from applying a force to the first or second lock pin 340 or 350. The upper surface of the other side of the lever bracket 530 is maintained to be contacted against the lower surface of the lever stopper 220 by the lever spring 540 in a normal state.

The operation of the present invention as configured above is described hereafter with reference to the drawings.

Figure 6:
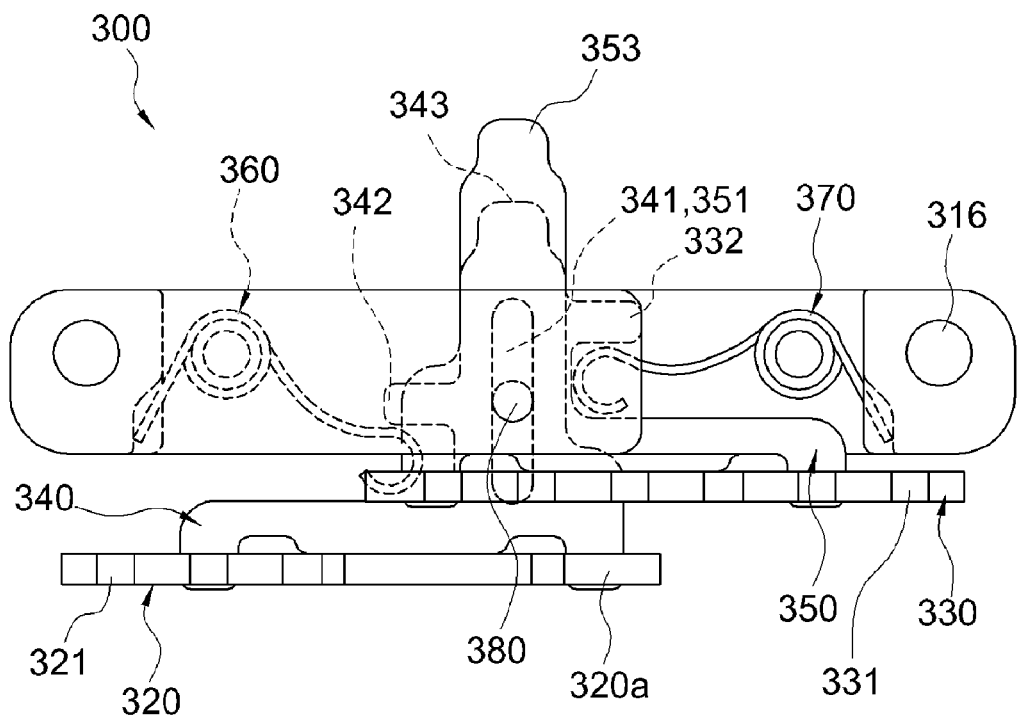
FIG. 6 is a perspective view showing the operation of the seat locking assembly of the present invention (first lock).

Referring to FIG. 6, the second lock protrusions 331 of the second lock 330 extend through the guide holes 210 of the upper rail 200 by means of the elastic force of the second elastic member 370 and thus, are maintained to be inserted into the lock grooves 120 of the lower rail 100, in a normal state, that is, when an external force is not applied, so that the lower rail 100 and the upper rail 200 are fixed to each other. In this state, the seat is maintained to be in a locked state in which it cannot move forward and backward.

When an external force is applied, the operating lever 520 moves the lever bracket 530 down against the elastic force of the lever spring 540 and the lever bracket 530 is then contacted against the second upper end 353 so that the second lock pin 350 also moves down against the elastic force of the second elastic member 370. When the second lock protrusions 331 of the second lock 330 connected with the second lock pin 350 are separated from the lock grooves 120 of the lower rail 100, the upper rail 200 is slidable on the lower rail 100. In this state, the seat is maintained in an unlocked state in which it can move forward or backward.

In this case, when the second lock protrusions 331 moves forward or backward by the second pitch P2 and are inserted into the lock grooves 120, the position of the seat is adjusted by the second pitch P2. However, when the upper rail 200 moves forward or backward by a half of the second pitch P2, the second lock protrusions 331 cannot be inserted into the lock grooves 120 and the seat is fixed through the following operation.

Figure 7:
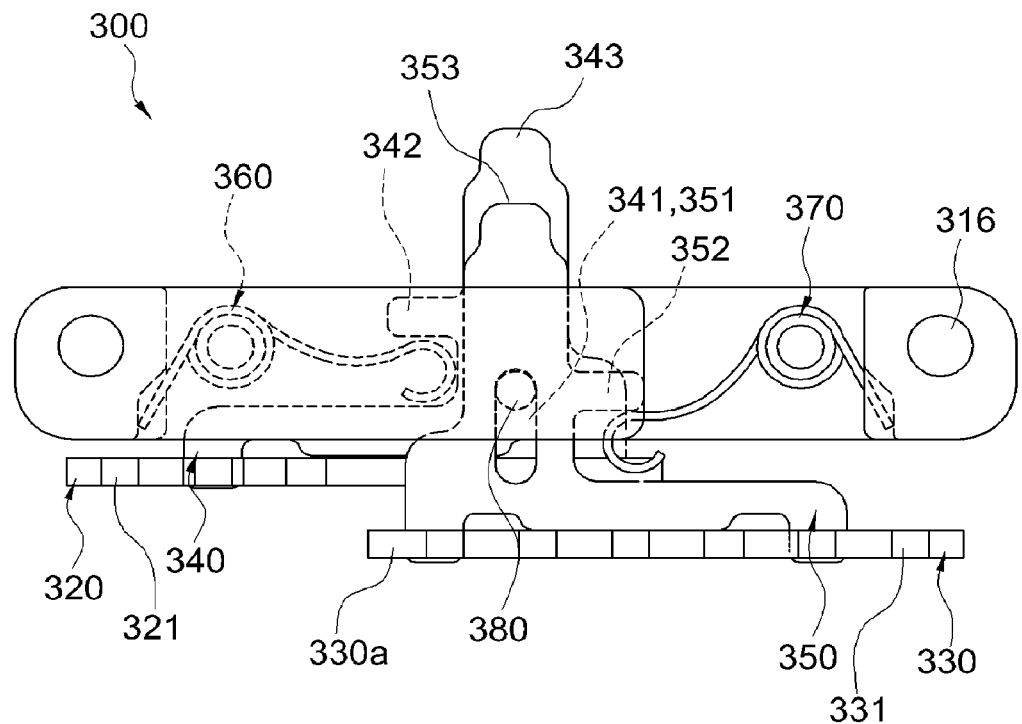
FIG. 7 is a perspective view showing the operation of the seat locking assembly of the present invention (second lock).

Referring to FIG. 7, the first lock protrusions 321 of the first lock 320 extend through the guide holes 210 of the upper rail 200 by means of the elastic force of the first elastic member 360 and thus, are maintained to be inserted into the lock grooves 120 of the lower rail 100, so that the lower rail 100 and the upper rail 200 are fixed to each other.

Similarly, when the first lock protrusions 321 moves forward or backward by the first pitch P1 and are inserted into the lock grooves 120, the position of the seat is adjusted by the first pitch P1. However, when the upper rail 200 moves forward or backward by a half of the first pitch P1, the second lock protrusions 331, instead of the first lock protrusions 321, are inserted into the lock grooves 120, so that the seat can be fixed forward or backward by a half of the first pitch P1.

In other words, the first lock protrusions 321 or the second lock protrusions 331 are alternately inserted into the lock grooves 120 every time the upper rail moves by a half of the pitch between the lock protrusions, so that the seat can be finely adjusted at a half of a pitch.

The spirit of the present invention should not be construed as being limited to the embodiments described above. The present invention may be applied to various fields and may be implemented in various ways by those skilled in the art, without being apart from the scope of the present invention. Therefore, the modifications and changes are included in the present invention, as long as they are apparent to those skilled in the art.

The invention claimed is:

1. A seat track locking system for a vehicle, the locking system comprising:
    a lower rail fixed to a floor of an inside of the vehicle, the lower rail having lock grooves formed thereon at regular intervals along a longitudinal direction of the vehicle, the lock grooves each being opened downwardly;
    an upper rail fixed to a bottom of a vehicle seat and inserted into the lower rail to be slidable on the lower rail in the longitudinal direction of the vehicle;
    a seat locking assembly mounted in the upper rail and fixing or sliding the upper rail on the lower rail by means of an operating part,
    the seat locking assembly comprising:
    a lock bracket mounted on an inner side of the upper rail;
    a first lock vertically-movably mounted in the lock bracket and having a substantially horizontal first plate with first lock protrusions extending outwardly from opposite sides of the first plate, said first lock protrusions insertable into the lock grooves, wherein the first lock is elastically biased upwardly by a first elastic member mounted on a first lateral side of the lock bracket, and the first lock protrusions are spaced apart from each other at a first pitch P1; and
    a second lock vertically-movably mounted in the lock bracket and having a substantially horizontal second plate with second lock protrusions extending outwardly from opposite sides of the second plate, said second lock protrusions insertable into the lock grooves, wherein the second lock is elastically biased upwardly by a second elastic member mounted on a second lateral side of the lock bracket and the second lock protrusions are spaced apart from each other at a second pitch P2;
    wherein the first lock includes a first side extending part extending along a longitudinal direction of the upper rail toward the second lock creating a first recessed portion in the first lock, and the second lock includes a second side extending part extending along the longitudinal direction of the upper rail toward the first lock creating a second recessed portion in the second lock, and the first lock and the second lock are arranged in a line along the longitudinal direction of the upper rail, wherein the first side extending part is located within the second recessed portion of the second lock, and the second side extending part is located within the first recessed portion of the first lock, wherein a third pitch P3 is set between the first lock and the second lock to be larger than the first pitch P1 or the second pitch P2 by a value of a half of the first pitch P1 or the second pitch P2, so that only the protrusions of one of the first lock and the second lock are inserted into the lock grooves of the lower rail.

2. The seat track locking system according to claim 1, wherein the seat locking assembly includes:

a first lock pin having an upper end extending above an upper end of the upper rail and a lower end coupled to the first lock, the first lock pin retained within the lock bracket, wherein the first lock pin delivers an external force from the operating part to the first lock; and a second lock pin having an upper end extending above the upper end of the upper rail and a lower end coupled to the second lock, the second lock pin retained within the lock bracket, wherein the second lock pin delivers the external force from the operating part to the second lock.

3. The seat track locking system according to claim 2, wherein the seat locking assembly includes:

a vertically elongated first slit hole extending through the first lock pin;

a vertically elongated second slit hole extending through the second lock pin;

a guide pin hole formed in a location of the lock bracket corresponding to the first slit hole and the second slit hole; and a guide pin inserted into the first slit hole, the second slit hole and the guide pin hole.

4. The seat track locking system according to claim 2, wherein:

the first elastic member includes one end fitted to a first fixing shaft formed in the first lateral side of the lock bracket and a second end supported by the first lock pin such that when the first lock protrusions are within the lock grooves of the lower rail, the first lock protrusions are maintained inside the lock grooves; and the second elastic member includes one end fitted to a second fixing shaft formed in the second lateral side of the lock bracket and a second end supported by the second lock pin such that when the second lock protrusions are within the lock grooves of the lower rail, the second lock protrusions are maintained inside the lock grooves, wherein the first elastic member and the second elastic member are coil torsion springs.

5. The seat track locking system according to claim 2, wherein the operating part includes:

a lever rod coupled to one side of the upper rail, the lever rod comprising a longitudinal axis to rotate about;

an operating lever having one end fixed to the lever rod;

a lever bracket having one end fixed to the lever rod and a second end positioned at the upper ends of the first lock pin and the second lock pin, and further comprising a lever stopper disposed on the upper rail to prevent separation of the lever bracket, wherein when the external force is applied to the operating lever, the lever rod rotates and the lever bracket forces the first and second locks out of engagement with the lower rail to allow the upper rail to slide on the lower rail.

6. The seat track locking system according to claim 1, wherein the seat locking assembly includes:

first side holes formed at one side of the upper rail;

second side holes formed on the lock bracket in locations corresponding to the first side holes; and pin locks inserted into and fixed to the first side holes and the second side holes.

\* \* \* \* \*